United States Patent
Cho (10) Patent No.: US 11,548,799 B2
(45) Date of Patent: Jan. 10, 2023

(54) SYSTEM AND METHOD FOR WATER TREATMENT WITH PULSED ELECTRIC FIELDS

(71) Applicant: ONVECTOR LLC, King of Prussia, PA (US)

(72) Inventor: Daniel J. Cho, Philadelphia, PA (US)

(73) Assignee: Onvector LLC, King of Prussia, PA (US)

(*) Notice: Subject to any disclaimer, the term of this patent is extended or adjusted under 35 U.S.C. 154(b) by 299 days.

(21) Appl. No.: 16/871,611

(22) Filed: May 11, 2020

(65) Prior Publication Data

US 2020/0361797 A1    Nov. 19, 2020

Related U.S. Application Data

(60) Provisional application No. 62/920,739, filed on May 13, 2019.

(51) Int. Cl.
 C02F 1/48      (2006.01)
 C02F 1/461     (2006.01)

(52) U.S. Cl.
 CPC .......... *C02F 1/48* (2013.01); *C02F 1/46109* (2013.01); *C02F 2201/003* (2013.01); *C02F 2201/48* (2013.01); *C02F 2303/04* (2013.01)

(58) Field of Classification Search
 CPC combination set(s) only.
 See application file for complete search history.

(56) References Cited

U.S. PATENT DOCUMENTS

| | | | |
|---|---|---|---|
| 2016/0137529 A1* | 5/2016 | Cho | H05H 1/52 315/111.21 |
| 2016/0152494 A1* | 6/2016 | Cho | C02F 1/4608 210/243 |
| 2017/0029300 A1* | 2/2017 | Yeung | C02F 1/48 |

OTHER PUBLICATIONS

Bai-Lin Qin et al., Inactivation of Microorganisms by Pulsed Electric . . . , IEEE Transactions on Dielectrics and Electrical Insulation v. 1 (6), Dec. 1994, pp. 1047-1057.

Takayuki Ohshima et al., Selective release of intracellular protein using pulsed electric field, J. of Electrostatics v. 35, 1995, pp. 103-112.

Karl H. Schoenbach et al., The Effect of pulsed Electric Fields on Biological Cells . . . , IEEE Transactions on Plasma Science v. 25 (2), Apr. 1997, pp. 284-292.

Bai-Lin Qin et al., Inactivating Microorganisms Using a Pulsed Electric Field . . . , IEEE Transactions on Industry Applications v. 34 (1), Jan./Feb. 1998, pp. 43-50.

(Continued)

*Primary Examiner* — Xiuyu Tai
(74) *Attorney, Agent, or Firm* — Mintz Levin Cohn Ferris Glovsky and Popeo, P.C.

(57) ABSTRACT

A water treatment system includes a water inlet that intakes water to be treated, a high voltage (HV) electrode having a porous metal surface area in a range of between 0.1 cm² and 5 cm² in fluid communication with the water, such that the water flows through the porous metal surface area of the HV electrode, a ground electrode disposed across a gap from the HV electrode, in fluid communication with the water, a high voltage power supply electrically connected to the HV electrode for generating spark plasma or pulsed electric fields having a rise time equal to or less than 60 nanoseconds (ns) and an amplitude greater than or equal to 30 kV/cm across the gap, thereby producing treated water, and a water outlet that discharges the treated water.

20 Claims, 10 Drawing Sheets

(56) References Cited

OTHER PUBLICATIONS

N. J. Rowan et al., Pulsed electric field inactivation diarrhoeagenic Bacillus cereus through irreversible . . . , Letters in Applied Microbiology v. 31, 2000, pp. 110-114.
K. H. Schoenbach et al, Bacterial Decontamination: of Liquids . . . , IEEE Transactions on Dielectrics and Electrical Insulation v. 7 (5), Oct. 2000, pp. 637-645.
Petr Lukes, Water Treatment by Pulsed Streamer Corona Discharge, Ph.D. Thesis, Institute of Chemical Technology and Institute of Plasma Physics, Prague, 2001, pp. 1-131.
V. Heinz et al., Impact of temperature on lethality and energy efficiency. . . , Innovative Food Science and Emerging Technologies v. 4, 2003, pp. 167-175.
Seacheol Min et al., Commercial Scale Pulsed Electric Field Processing of Tomato Juice, J. Agric. Food Chem. v. 51, 2003, pp. 3338-3344.
Zuzana Zivcova et al., Thermal conductivity of porous alumina ceramics prepared using starch . . . , J. of the European Ceramic Society v. 29, 2009, pp. 347-353.
Yong Yang, Plasma Discharge in Water and its Applications for Industrial Cooling Water Treatment, Ph.D. Thesis, Drexel University, Philadelphia, Jun. 2011, pp. 1-172.
Hyoung-Sup Kim et al., Inactivations of bacteria by application of spark plasma in produced water, Separation and Purification Technology v. 156, 2015, pp. 544-552.
Branislav Pongrac et al., Spectroscopic characteristics of H/O atomic lines generated by nanosecond . . . , J. Phys. D: Appl. Phys. v. 51 (12), Feb. 2018, pp. 124001-124010.

\* cited by examiner

SYSTEM AND METHOD FOR WATER TREATMENT WITH PULSED ELECTRIC FIELDS

The present application claims priority to U.S. Provisional Patent Application No. 62/920,739 entitled "System And Method For Water Treatment With Pulsed Electric Fields" filed May 13, 2019, which is hereby incorporated by reference in its entirety.

BACKGROUND

A water filter is used to remove impurities in water using a fine physical barrier. One of the simplest barriers is a screen filter, a type of filter using a screen to separate/remove suspended particles such as sand out of water. It is often used for irrigation or industrial applications with relatively large pore sizes in the range of 10-1,000 microns. Typical screen materials include stainless steel mesh, polypropylene, nylon and polyester.

Another class of filter is a membrane filter, which includes microfiltration (with pore size of 0.1-10 microns), ultrafiltration (with pore size of 0.01-0.1 microns), nanofiltration (with pore size of 0.001-0.01 microns), and reverse osmosis (with pore size less than 0.001 microns). Microfiltration is generally used to remove particles greater than 50 nm; ultrafiltration is generally used to remove particles greater than 3 nm; nanofiltration is generally used to remove particles greater than 1 nm, and reverse osmosis is generally used to remove particles greater than 0.1 nm. Since a typical size of bacteria is in the range of 0.1-8 microns, whereas that of viruses is in the range of 0.01-0.1 microns, ultrafiltration, nanofiltration, and reverse osmosis are often used to remove particles, colloids and macromolecules, so that wastewater can be disinfected. The cost of membrane filters is significantly larger than that of screen filters. Furthermore, the aforementioned membrane filters need a significantly higher head pressure due to smaller pore sizes than a screen filter.

Another disinfection approach that has been studied since the 1960's is the application of pulsed electric fields (PEF), with a magnitude typically greater than 20 kV/cm, for short durations (e.g., 500 ns to 4 µs) to liquids, thereby inducing severe electroporation (i.e., the formation of pores in cell membranes by the action of high voltage electric fields), cell membrane breakdown, and cell death. Plasma methods, such as pulsed spark discharges, which effectively combine the contributions of UV radiation, reactive chemical species (e.g., hydroxyl radical, ozone, hydrogen peroxide), and high electric fields can be considered as an alternative to conventional water treatment methods. For such applications, a non-thermal plasma system that can generate gas-phase plasmas in contact with liquids is often used, as such a system consumes less power and produces less liquid heating than a typical thermal plasma system. A non-thermal plasma is a low temperature plasma, having a temperature of about 3,000 K or less. Since the gas-phase plasma can only interact with the liquid through the gas-liquid interface, the interface area is typically maximized by injecting gas over the HV electrode. The injection of gas, however, typically requires the use of a compressor, which is expensive, noisy, and consumes a large amount of electric power.

Furthermore, in some applications, such as irrigation water management, the water flowrate is relatively small at dripping emitters (i.e., 1-3 l/hr/emitter). When the pipe diameter is relatively small (i.e., channel widths of 1-2 mm), and the liquid flowrate is also small, the presence of gas bubbles can create a resistive force to flow due to the surface tension at the interface between the liquid-gas-pipe wall, which can almost equal the hydrostatic force of the water pressure, thus stopping the liquid flow.

Therefore, there is a need for continuing improvement in water treatment with pulsed spark discharges and pulsed electric fields with a disinfecting capability for water, river water, seawater, industrial wastewater, and produced water from fracking operations.

SUMMARY

Various embodiments disclosed herein relate to methods and apparatus for water treatment with pulsed electric fields. In accordance with one or more embodiments, a water treatment system includes a water inlet that intakes water to be treated, a high voltage (HV) electrode having a porous metal surface area in a range of between 0.1 $cm^2$ and 5 $cm^2$ in fluid communication with the water, such that the water flows through the porous metal surface area of the HV electrode, a ground electrode disposed across a gap from the HV electrode, in fluid communication with the water, a high voltage power supply electrically connected to the HV electrode for generating pulsed electric fields having a rise time equal to or less than 60 nanoseconds (ns) and an amplitude greater than or equal to 30 kV/cm across the gap, thereby producing treated water, and a water outlet that discharges the treated water. In some embodiments, the water to be treated can have an electrical conductivity in a range of between 0.1 mS/cm and 5 mS/cm. In certain embodiments, the gap can be less than or equal to 1 cm. In some embodiments, the HV electrode and the ground electrode can be opposing parallel plates. In certain of these embodiments, the HV electrode and the ground electrode can be circular plates. In other of these embodiments, the HV electrode and the ground electrode can be square plates. In still other of these embodiments, the HV electrode and the ground electrode can be rectangular plates. In certain of these embodiments, the ground electrode can have a porous metal surface area, such that the water flows through the porous metal surface area of the ground electrode. In some of these embodiments, the system can further include a plurality of pairs of HV electrode and ground electrode opposing parallel plates arranged in serial fluid communication with the water to be treated. In other of these embodiments, the system can further include a plurality of pairs of HV electrode and ground electrode opposing parallel plates arranged in parallel fluid communication with the water to be treated. In certain other embodiments, the ground electrode can have a center axis that is coaxial and cylindrically symmetric with the HV electrode, with the gap between the HV electrode and the ground electrode perpendicular to the center axis. In some of these embodiments, the HV electrode can be a cylindrical metal mesh. In certain of these embodiments, the ground electrode can have a diameter that is smaller than a diameter of the HV electrode. In some of these embodiments, the ground electrode can be a cylindrical metal mesh. in certain embodiments, the ground electrode can have a diameter that is larger than a diameter of the HV electrode. In some embodiments, the ground electrode can include metal rods. In certain embodiments, the system can further include a bubble generator for introducing gas into the gap between the HV electrode and the ground electrode while generating the pulsed electric fields. In some embodiments, the system can further include a porous ceramic block in the gap between the HV electrode and the ground electrode. In certain embodiments, the high voltage power supply can be configured to generate pulsed electric fields at a frequency in a range of between 10 Hz and 70 Hz. In some embodiments, the high voltage power supply can be configured to generate pulsed electric fields having an amplitude in a range of between 50 kV/cm and 100 kV/cm.

In accordance with one or more embodiments, a method of water treatment includes flowing water to be treated through a porous metal surface area of a high voltage (HV) electrode across a gap toward a ground electrode in fluid communication with the water, and generating pulsed electric fields having a rise time equal to or less than 60 nanoseconds (ns) and an amplitude greater than or equal to 30 kV/cm across the gap, thereby producing treated water. In some embodiments, the method can further include introducing gas into the gap between the HV electrode and the ground electrode while generating the pulsed electric fields.

The water treatment systems and methods described herein have many advantages, including the use of the HV electrode and ground electrode at the filter outlet such that 100% of filtered water can be treated by pulsed PEF/spark plasma without interfering with the filtration and back-wash processes.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements. The figures are not necessarily drawn to scale, emphasis instead being placed upon illustrating embodiments.

FIG. 1A-1 is a simplified cross-section view of a water treatment system in accordance with one or more embodiments.

FIG. 1A-2 is a simplified cross-section view of a water treatment system including a ground electrode having a porous metal surface area, such that the water flows through the porous metal surface area of the ground electrode in accordance with one or more embodiments.

DETAILED DESCRIPTION

It is to be understood that the figures and descriptions of the present invention have been simplified to illustrate elements that are relevant for a clearer comprehension of the present invention, while eliminating, for the purpose of clarity, many other elements found in systems and methods of plasma discharge in liquid. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

"HV" as used herein means high-voltage, such as a voltage in excess of 1,000 V.

Ranges: throughout this disclosure, various aspects of the invention can be presented in a range format. It should be understood that the description in range format is merely for convenience and brevity and should not be construed as an inflexible limitation on the scope of the invention. Where appropriate, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Figure 1A:
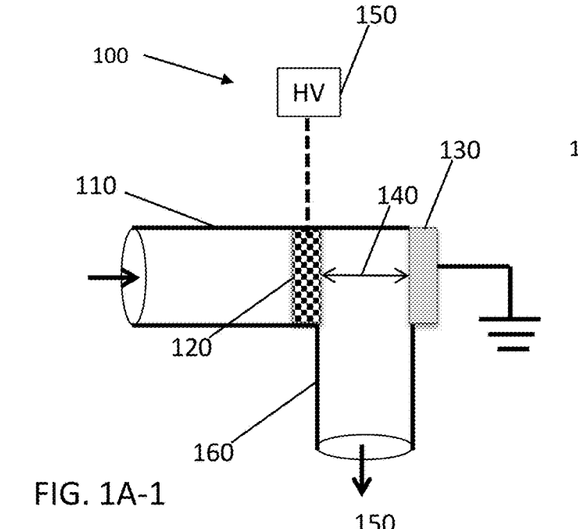
Figure 1A:
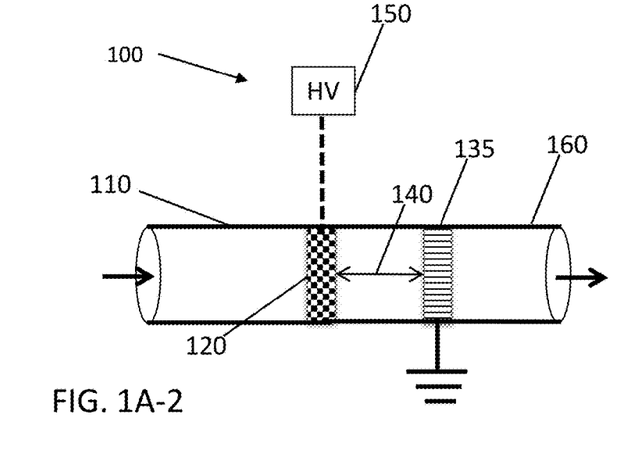

The objective of the systems and methods described herein is to disinfect various types of liquids, including water, river/lake water, seawater, industrial wastewater, and produced water from fracking operations, and to remove contaminants in wastewater and leachates and oxidize and decompose them without leaving any treatment gap or secondary waste problems. Various embodiments disclosed herein relate to methods and apparatus for water treatment with pulsed electric fields, including two electrodes (i.e., HV and ground electrodes) separated by a small gap distance. In one embodiment, as shown in FIG. 1A-1, a water treatment system 100 includes a water inlet 110 that intakes influent water to be treated, a high voltage (HV) electrode 120 having a porous metal surface area in a range of between 0.1 cm$^2$ and 5 cm$^2$ in fluid communication with the water, such that the water flows through the porous metal surface area of the HV electrode 120, a ground electrode 130 disposed across a gap 140 from the HV electrode 120, in fluid communication with the water, a high voltage power supply 150 electrically connected to the HV electrode 120 for generating pulsed electric fields having a rise time equal to or less than 60 nanoseconds (ns) and an amplitude greater than or equal to 30 kV/cm across the gap 140, thereby producing treated water, and a water outlet 160 that discharges the treated effluent water. The HV electrode 120 is made of a screen-shape metal mesh, which is electrically connected to the HV power supply 150. The screen mesh has relatively large pores (i.e., pore diameters greater than 10 microns). In another embodiment, shown in FIG. 1A-2, the ground electrode 135 is also made of a screen-shape metal mesh having relatively large pores (i.e., pore diameters greater than 10 microns), such that the water flows through the porous metal surface area of the ground electrode 135.

In order to generate pulsed electric fields (PEF) or spark discharges, there are two key parameters that need to be satisfied: one is a high electric field of approximately 30-60 kV/cm or more, and the other is a fast rise time of approximately 50-60 ns (nano seconds) or less. The energy required to generate the pulses will be approximately 5 J per pulsed at a frequency of 50 Hz. In other words, 50 pulses per second deliver about approximately 250 W of power to water continuously.

The frequency of PEF/spark pulses is chosen such that bacteria or virus in water is exposed to at least one PEF/spark pulse as water passes through the water treatment system 100. For example, in case of a water treatment system 100 including a HV electrode 120 with a cross-sectional area of 1 cm$^2$ and a flowrate of one gpm (~63 mL/s), the flow velocity becomes 63 cm/s. In this case, one needs 63 PEF/spark pulses per second (i.e., 63 Hz) to have bacteria or virus in water exposed to at least one PEF/spark pulse. If the flow rate increases to two gpm, then the frequency doubles to 126 Hz.

The frequency of PEF/spark pulses can also be chosen such that there is sufficient evaporation of the water at the HV electrode surface to produce sparks without injection of gas into the gap between the HV and ground electrodes. If the HV electrode has a pore size of 100 microns, and the pores are filled with liquid water to be treated, then, when spark discharges reach quasi-steady-state, the temperature of the spark discharges at the surface of the HV electrode is about 3,000 K for a non-thermal plasma, as described above. Since the liquid in the pore is at room temperature, there is a conduction heat transfer between the plasma and the liquid. The heat transfer rate (in watts W) can be estimated by Fourier's law:

$$q[W] = -kA\frac{dT}{dx} = 0.3[W] \quad (1)$$

where the thermal conductivity of water is 0.7 W/mK, area A can be approximated as $10^{-8}$ m$^2$, dx is $0.5*10^{-4}$ m, and dT is 3,000K. The thermal energy that is needed to evaporate room-temperature water to vapor can be estimated as $$\text{Thermal energy }[J] = \text{mass}*[C_p*\Delta T + \Delta h_{fg}] = 2.6*10^{-3}[J] \quad (2)$$

where mass is $10^{-9}$ kg, $C_p$ for water is 4.2 kJ/kgK, $\Delta T$ is 90K, and $\Delta h_{fg}$ is 2,265 kJ/kg.

Comparing the heat transfer from plasma to water and the thermal energy needed to evaporate water, one can find that there is sufficient heat transfer rate [W] from plasma to water, but the minimum duration time of heat transfer should be approximately 10 ms, indicating that the frequency of the spark discharge should be 100 Hz or less. Once water vapor is formed at the surface of the HV electrode, then spark discharges can be generated from the HV electrode surface without injection of gas into the gap between the HV and ground electrodes. Spark discharges are not required for water treatment, however, because PEFs with an amplitude of 30-60 kV/cm and a frequency of 10-100 Hz are sufficient to kill bacteria, as described above.

If the water is mostly ground water and surface water, then the electric conductivity is relatively small (i.e., compared to sea water). The conductivity of surface water can be in the range of 0.1-0.5 mS/cm, whereas that of ground water can be in the range of 0.5-5.0 mS/cm. Thus, in order to achieve the high electric field of 60 kV/cm, the gap distance 140 between the two electrodes needs to be relatively small, i.e., 1 cm or less. Since the resistivity of water is determined from its conductivity, one can estimate the maximum size (i.e., surface area) of the electrodes as described below.

Given that a voltage difference of 60 kV in a 1 cm gap is needed, $$60 \text{ kV} = i*R \quad (3)$$

where the magnitude of the current i is in the range of 30 A or less, and the resistance of the water across the two electrodes 120 and 130 should be approximately 2,000Ω.

Figure 2:
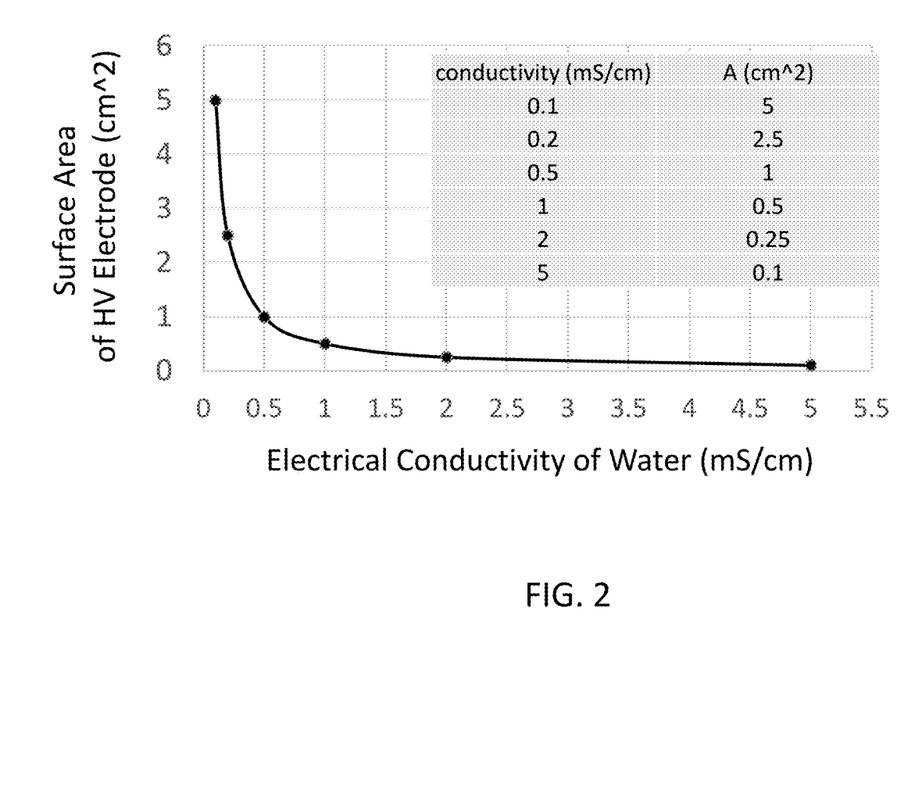
FIG. 2 is a graph of the surface area (cm$^2$) of the HV electrode as a function of the electrical conductivity of water (mS/cm) in accordance with one or more embodiments.

For water with electric conductivity of 0.5 mS/cm, its resistivity ρ becomes 1/0.0005=20 Ω·m. The resistivity of water with a different electrical conductivity can be determined similarly. Since the resistance R between the two electrodes can be described as $$R = \frac{\rho L}{A} \quad (4)$$

where L is the gap distance and A is the surface area of the HV electrode 120, one can find the maximum surface area of the HV electrode as shown in FIG. 2. The results in FIG. 2 show that for water with 0.5 mS/cm, the maximum HV electrode surface area is 1 cm$^2$, whereas for water with 0.1 mS/cm, the maximum HV electrode surface area can be much greater, i.e., 5 cm$^2$. However, for water with a high conductivity (i.e., greater than 5 mS/cm), the maximum HV electrode surface area becomes asymptotically smaller.

In general, if the conductivity of water is low (i.e., less than about 0.5-1.0 mS/cm), then a PEF amplitude of 60 kV/cm can readily be generated, while if the conductivity of water is high (i.e., greater than 1 mS/cm), it is not easy to have 60 kV/cm because the aforementioned resistance R between the two electrodes is small (i.e., decreases below 2,000 Ohms). In this case one would need a very large current, i.e., greater than several thousand amperes, a condition that cannot be met in the circuit design of a typical power supply, to generate a PEF amplitude of 60 kV/cm.

Figure 1B:
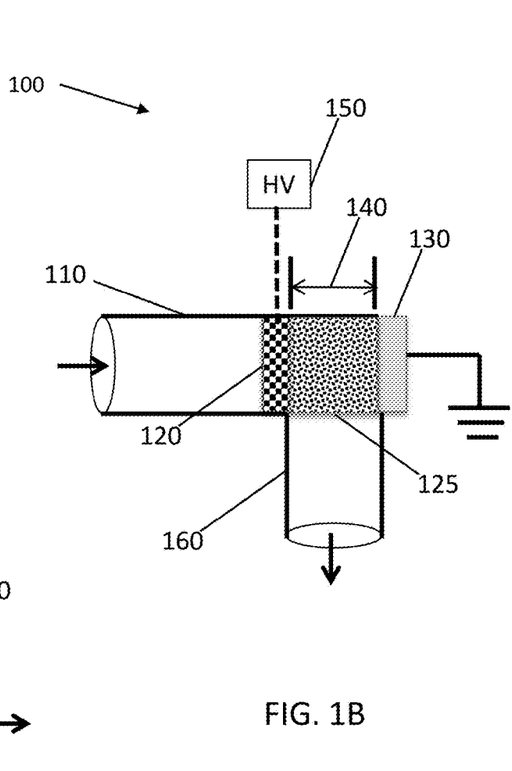
FIG. 1B is a simplified cross-section view of a water treatment system including a porous ceramic block in accordance with one or more embodiments.
Figure 3:
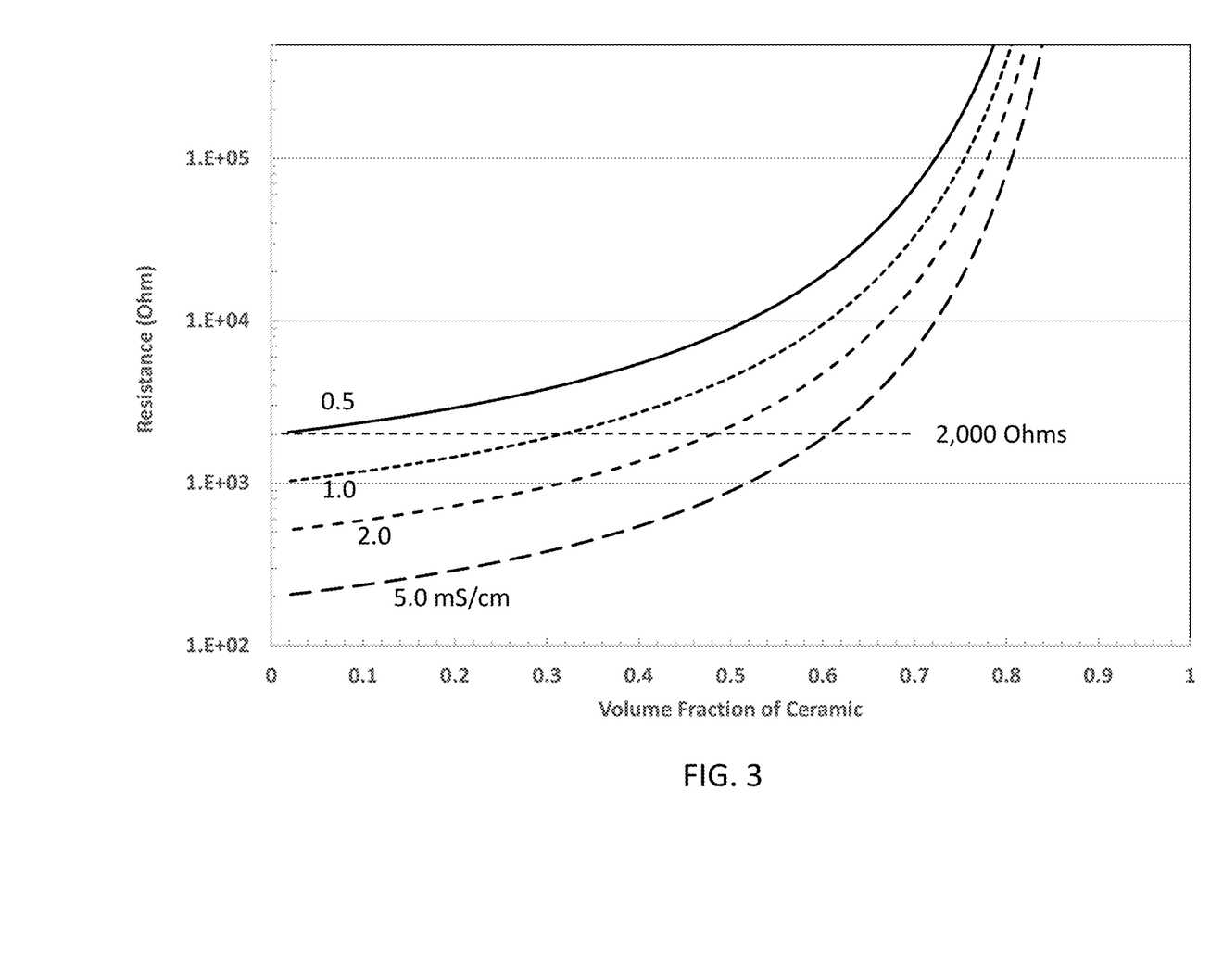
FIG. 3 is a graph of the resistance (Ohms) of the porous ceramic block shown in FIG. 1B as a function of the volume fraction of ceramic in accordance with one or more embodiments.

Accordingly, if there is a need to generate PEF/spark pulses in water whose conductivity is high (i.e., greater than 1 mS/cm), then, as shown in FIG. 1B, a porous ceramic block 125 with a controlled porosity can be used to vary the resistance between the two electrodes 120 and 130. The porous ceramic block 125 has air pores, which will be filled with water once the block 125 is immersed in water. The effective conductivity k of the water-filled porous ceramic block 125 is determined by $$k_{porous\ block} = k_{water}\left[\frac{-1.5\phi}{1-\phi}\right] \quad (5)$$

where $\phi$ is the volume fraction of voids in the porous ceramic block 125. See ivcová, Z., et al., *Thermal conductivity of porous alumina ceramics prepared using starch as a pore-forming agent*. Journal of the European Ceramic Society, 2009. 29(3): p. 347-353, which is incorporated by reference herein. The required volume fraction of ceramic for the desired resistance of 2,000 Ohms between the two electrodes 120 and 130, where the pores in the porous ceramic block 125 are filled with water with various electrical conductivities is listed in Table 1 and shown in FIG. 3.

TABLE 1

| Water Conductivity (mS/cm) | Volume Fraction of Ceramic |
|---|---|
| 0.5 | 0 |
| 1 | 0.32 |
| 2 | 0.48 |
| 5 | 0.61 |

Figure 4:
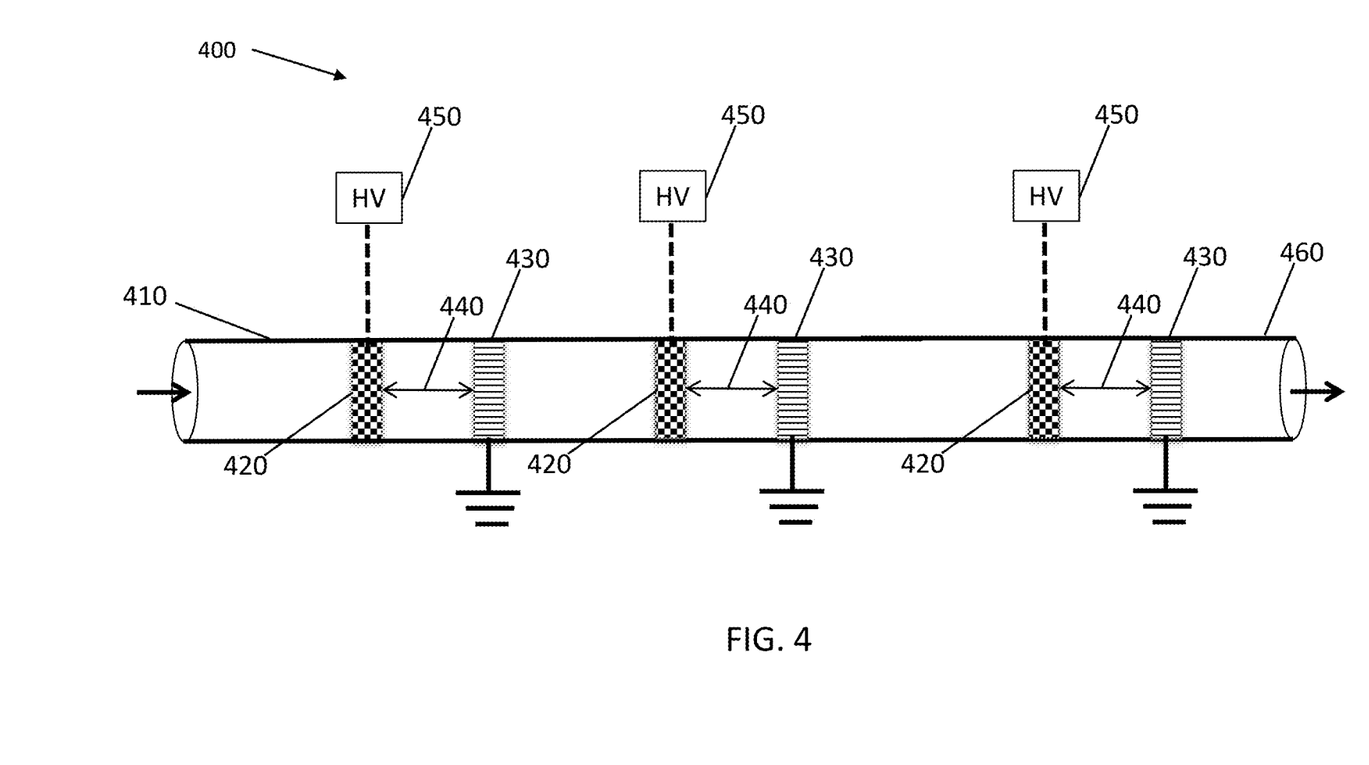
FIG. 4 is a simplified cross-section view of a water treatment system including a plurality of pairs of HV electrode and ground electrode opposing parallel plates arranged in serial fluid communication with the water to be treated in accordance with one or more embodiments.

When water quality is bad (i.e., water with a large quantity of undesirable toxic chemicals and microorganisms), one may want to treat the water multiple times. In this case, a water treatment system 400 includes a plurality of opposing parallel plate pairs of HV electrode 420 and ground electrode 430 across a gap 440 arranged in serial fluid communication with the water to be treated, as shown in FIG. 4, such that the water from a water inlet 410 can be treated repeatedly before being discharged from a water outlet 460. Note that each HV electrode 420 is connected to a separate HV power supply 450.

Figure 5:
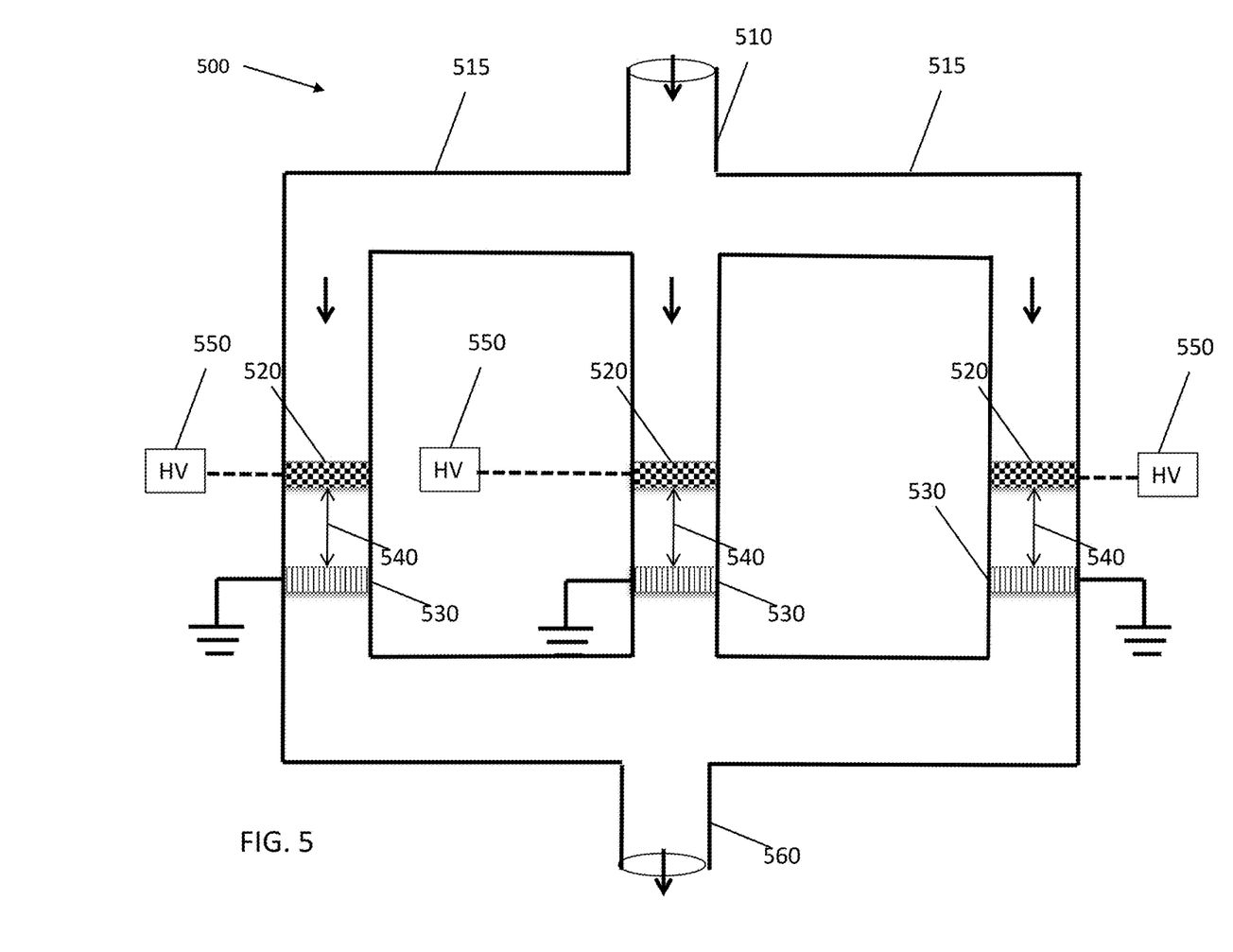
FIG. 5 is a simplified cross-section view of a water treatment system including a plurality of pairs of HV electrode and ground electrode opposing parallel plates arranged in parallel fluid communication with the water to be treated in accordance with one or more embodiments.

Since the physical size (i.e., surface area) of the HV and ground electrode is limited (i.e., less than 5 cm$^2$), the maximum volume of water that can be treated is also limited. When the volume of water to be treated is very large, a water treatment system 500 includes a plurality of opposing parallel plate pairs of HV electrode 520 and ground electrode 530 across a gap 540 arranged in parallel fluid communication with the water to be treated, as shown in FIG. 5. A manifold 515 is used to divide the water flow from a water inlet 510 into a plurality of smaller flowrate channels, so that the water to be treated can pass through each opposing parallel plate pair for optimal treatment before the treated water is discharged from the water outlet 560. Note that each HV electrode 520 is connected to a separate HV power supply 550.

Figures 6A, 6B:
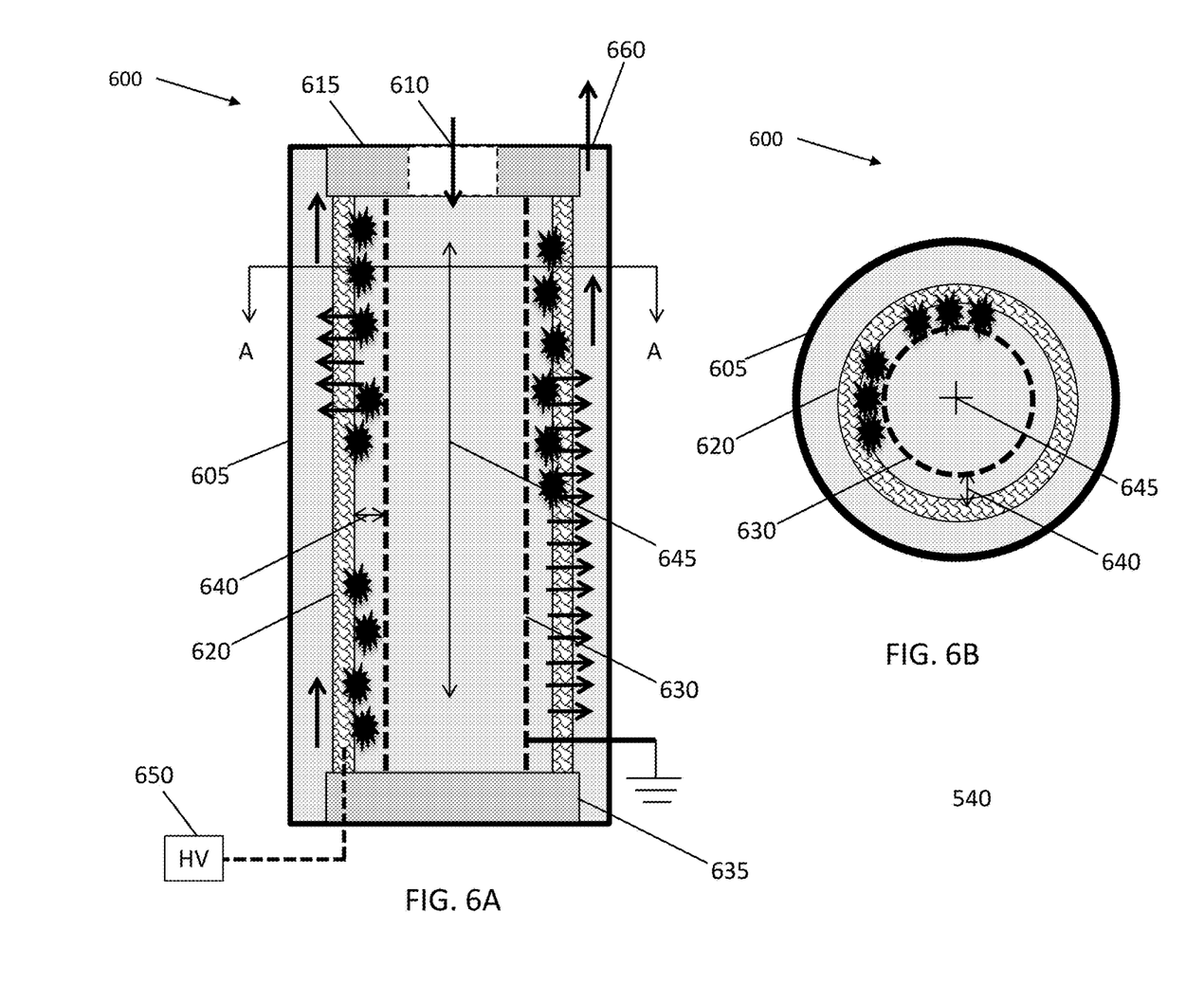
FIG. 6A is a simplified cross-section view of a water treatment system including dual metal mesh electrodes in accordance with one or more embodiments.
FIG. 6B is a simplified top-down view of a cross section along line A-A of the water treatment system shown in FIG. 6A in accordance with one or more embodiments.

In another embodiment, shown in FIGS. 6A-6B, a water treatment system 600 has a similar structure to a conventional cartridge filter using a cylindrical metal mesh screen filter. The difference is in the added functions of the metal mesh screen 620, which is electrically connected to a high-voltage power supply 650 and thus behaves as a porous HV electrode 620, while filtering suspended particles from influent water. The water treatment system 600 includes a non-metal vessel 605. The ground 630 electrode has a center axis 645 that is coaxial and cylindrically symmetric with the HV electrode 620. Both electrodes are mounted inside the non-metal vessel 605, on insulator blocks 615 and 635 made of ceramic, plastic, or other suitable electrical insulator material. The insulator block 615 also includes the water inlet 610 and water outlet 660, as shown in FIG. 6A. The HV electrode 620 is made of a cylindrical screen-shape metal mesh that has relatively large pores (i.e., greater than 10 microns). In the embodiment shown in FIG. 6A, the ground electrode 630 is also made of a cylindrical screen metal mesh that has a smaller-diameter and is positioned inside of the larger-diameter cylindrical metal mesh structure of the HV electrode 620. Alternatively, the ground electrode 630 can have a larger diameter than the HV electrode 620 (not shown). The HV cylindrical metal mesh electrode 620 is connected to an HV power supply 650, whereas the cylindrical metal mesh ground electrode 630 is connected to a ground source external to the liquid vessel 605. In contrast with the embodiment shown in FIGS. 1A-1 and 1A-2, where the gap 140 is parallel to a cylindrically symmetric axis of the opposing parallel plates 120 and 130/135, the gap 640 between the HV electrode 620 and the ground electrode 630 is perpendicular to the center axis 645. The gap distance 640 between the HV electrode 620 and the ground electrode 630 is approximately 1 cm or less, the distance needed to generate spark plasma or PEF in liquid.

When the voltage applied to the HV electrode 620 is sufficiently high (i.e., greater than 50-100 kV/cm) and the electrical pulse has a sufficiently short rise time (i.e., on the order of 20-100 ns, such as 20-50 ns), then a spark plasma or PEF is generated in the water to be treated. The HV power supply 650 generates fast rise pulses at a rate of 10-100 Hz, such as 10-70 Hz.

The conductivity of freshwater, such as river water, is on the order of 0.1-0.5 mS/cm, while the conductivity of seawater is approximately 30 mS/cm. The conductivity of landfill leachate can be as high as 200 mS/cm, which is on the same order of magnitude as produced water from fracking operations. The fast rise time of the pulse and the high voltage are needed to generate spark plasma using a gap distance of 1 cm or less particularly when the conductivity of the water is high (i.e., greater than 1 mS/cm).

In order to explain the need for the fast rise time, consider a case with a slow rise time of the pulse. In this case, one has a channel of breakdown, creating a cathodic hot spot in the ground electrode. Such a cathodic hot spot, once created, initiates an actual arc and thus produces a steam bubble, which bursts and creates cavitation, eventually damaging/destroying the ground electrode (i.e., cathode). With a fast rise time of the pulse, steam bubbles never have a chance to burst and an actual arc is not initiated. Instead, the fast-rising pulse branches out into multiple channels. Thus, one has a large number of glowing corona discharges or spark/PEF in the water to be treated all over the mesh electrode structure.

Figure 7A:
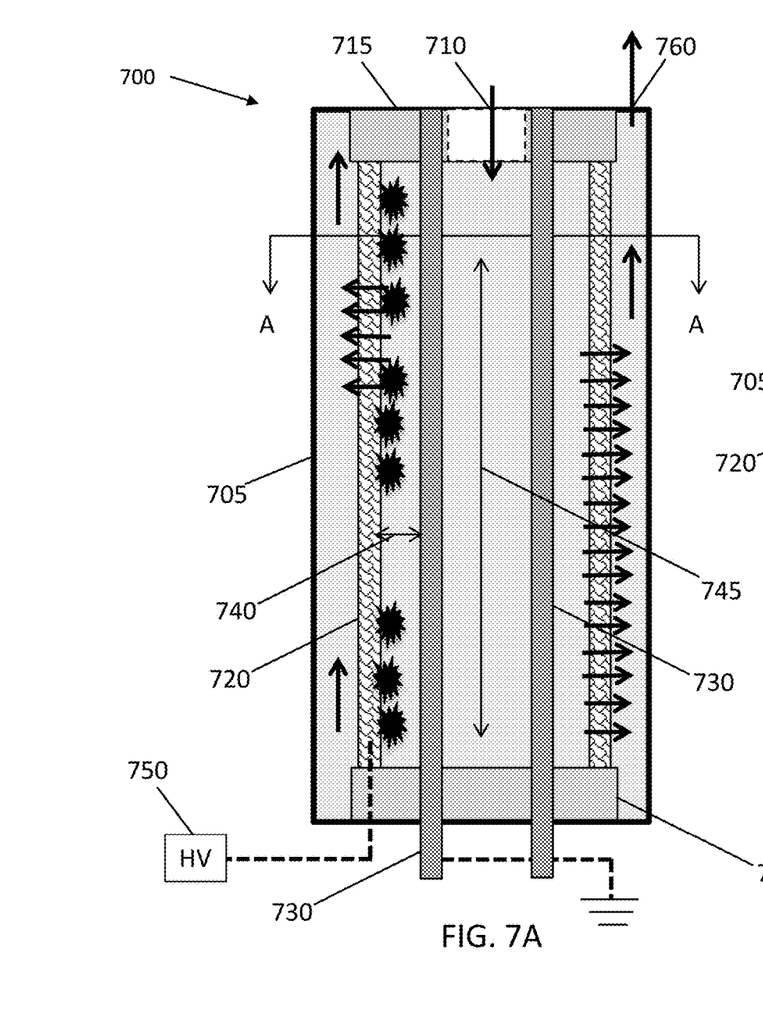
FIG. 7A is a simplified cross-section view of a water treatment system including a ground electrode comprising multiple metal rods in accordance with one or more embodiments.
Figure 7B:
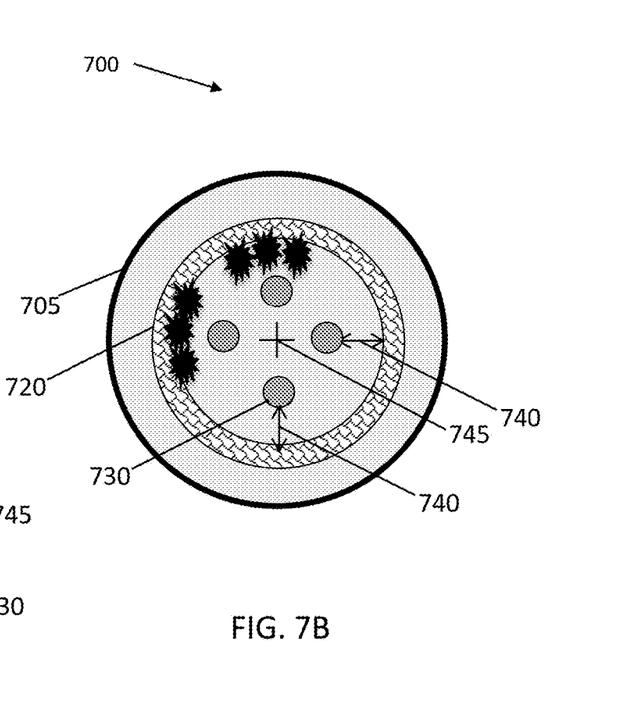
FIG. 7B is a simplified top-down view of a cross section along line A-A of the water treatment system shown in FIG. 7A in accordance with one or more embodiments.

In another embodiment, shown in FIGS. 7A-7B, the ground electrode is made of multiple metal rods. The metal mesh screen 720 is electrically connected to a high-voltage power supply 750 and thus behaves as a HV electrode 720, while filtering suspended particles from influent water. The water treatment system 700 includes a non-metal vessel 705. The HV 720 and ground 730 electrodes are mounted inside the non-metal vessel 705, on insulator blocks 715 and 735 made of ceramic, plastic, or other suitable electrical insulator material. The insulator block 715 also includes the water inlet 710 and water outlet 760, as shown in FIG. 7A. The HV electrode 720 is made of a screen-shape metal mesh that has relatively large pores (i.e., greater than 10 microns). In the embodiment shown in FIG. 7A, the ground electrode 730 is made of multiple metal rods positioned inside of the larger-diameter cylindrical metal mesh structure of the HV electrode 720. The ground electrode 730 has a center axis 745 that is coaxial and cylindrically symmetric with the HV electrode 720. The HV cylindrical metal mesh electrode 720 is connected to an HV power supply 750, whereas the metal rods 730 are connected to a ground source external to the liquid vessel 705. The gap 740 between the HV electrode 720 and the ground electrode 730 is perpendicular to the center axis 745. The gap distance 740 between the HV electrode 720 and the ground electrode 730 is approximately 1 cm or less, the distance needed to generate spark plasma in liquid.

Figures 8A, 8B:
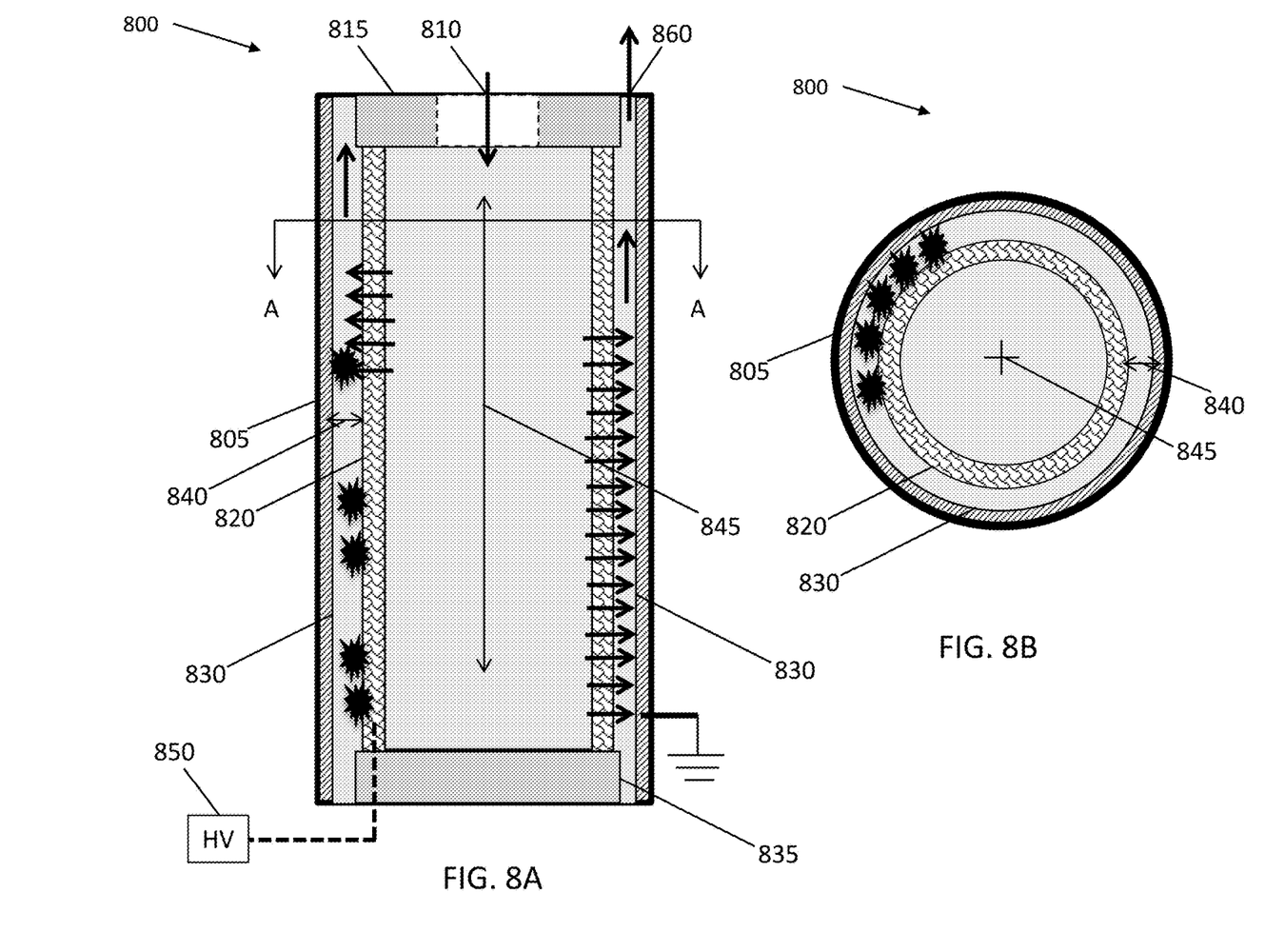
FIG. 8A is a simplified cross-section view of a water treatment system including a ground electrode formed from the metal wall of the liquid vessel in accordance with one or more embodiments.
FIG. 8B is a simplified top-down view of a cross section along line A-A of the water treatment system shown in FIG. 8A in accordance with one or more embodiments.
Figures 9A, 9B:
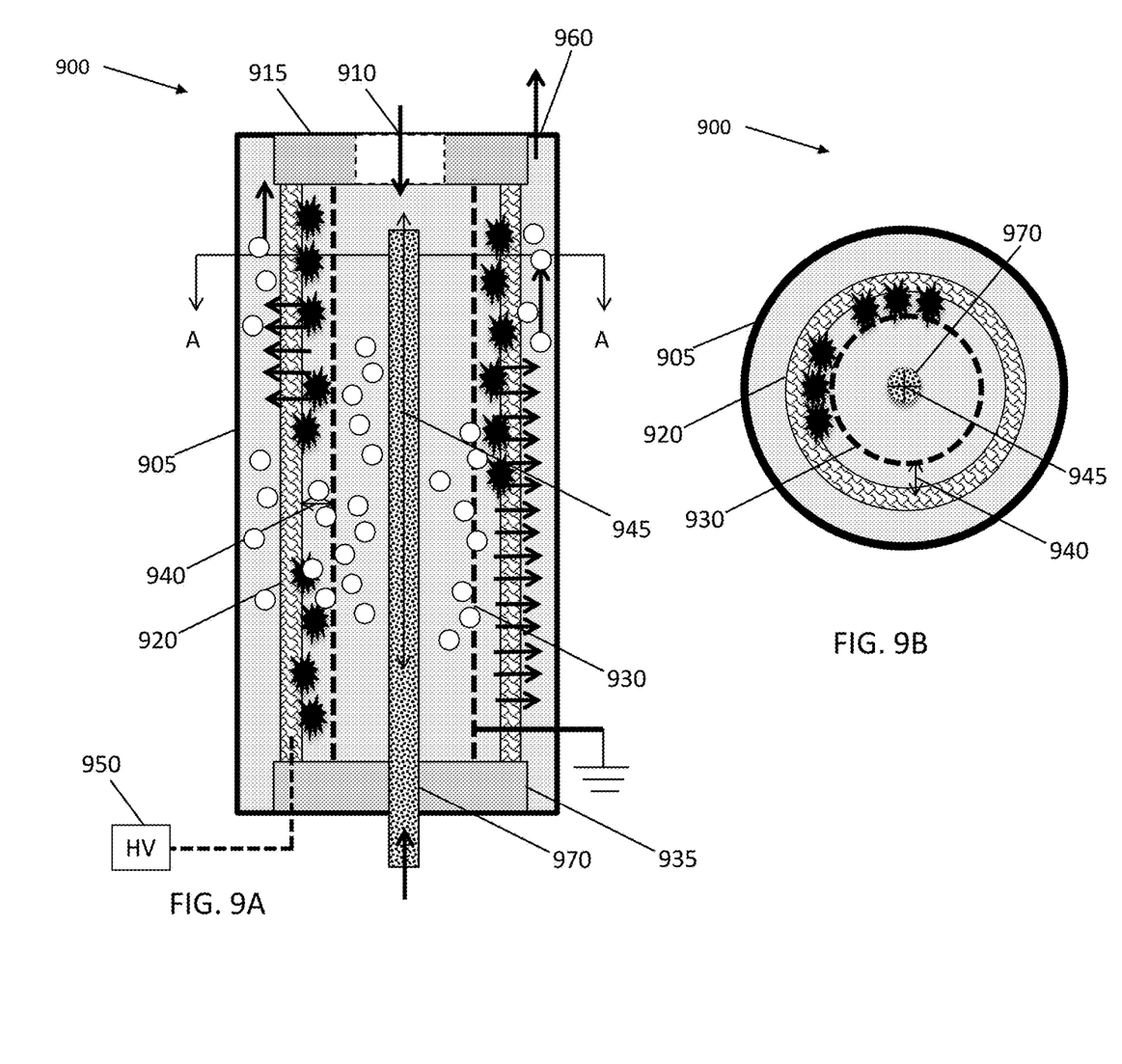
FIG. 9A is a simplified cross-section view of a water treatment system including a bubble generator in accordance with one or more embodiments.
FIG. 9B is a simplified top-down view of a cross section along line A-A of the water treatment system shown in FIG. 9A in accordance with one or more embodiments.

In another embodiment, shown in FIGS. 8A-8B, the ground electrode 830 is made of the inner metal wall of the liquid vessel 805. The metal mesh screen 820 is electrically connected to a high-voltage power supply 850 and thus behaves as a HV electrode 820, while filtering suspended particles from influent water into the water treatment system 800. The HV 820 electrode is mounted on insulator block 835 made of ceramic, plastic, or other suitable electrical insulator material. The insulator block 815 also includes the water inlet 810 and water outlet 860, as shown in FIG. 8A. The HV electrode 820 is made of a screen-shape metal mesh that has relatively large pores (i.e., greater than 10 microns). In the embodiment shown in FIG. 8A, the ground electrode 730 is made of the inner metal wall of the liquid vessel 805. The ground electrode 830 has a center axis 845 that is coaxial and cylindrically symmetric with the HV electrode 820. The HV cylindrical metal mesh electrode 820 is connected to an HV power supply 850, whereas the ground electrode 830 is connected to a ground source external to the liquid vessel 805. The gap 840 between the HV electrode 820 and the ground electrode 830 is perpendicular to the center axis 845. The gap distance 840 between the HV electrode 820 and the ground electrode 830 is approximately 1 cm or less, the distance needed to generate spark plasma in liquid In addition, in yet another embodiment, as shown in FIGS. 9A-9B, if one introduces gas (e.g., compressed air) in the form of a large number of microbubbles through a bubble generator 970 in the gap 940 between the HV electrode 920 and the ground electrode 930 while generating the pulsed electric fields, then these gas bubbles further accelerate the process of generating a series of small sparks in liquid. While the bubble generator 970 can be included in any of the embodiments shown in FIGS. 6A-8B, it is shown and described below in the dual metal mesh electrode arrangement for clarity. The metal mesh screen 920 is electrically connected to a high-voltage power supply 950 and thus behaves as a HV electrode 920, while filtering suspended particles from influent water. The water treatment system 900 includes a non-metal vessel 905. The HV 920 and ground 930 electrodes are mounted inside the non-metal vessel 905, on insulator blocks 915 and 935 made of ceramic, plastic, or other suitable electrical insulator material. The insulator block 915 also includes the water inlet 910 and water outlet 960, as shown in FIG. 9A. The HV electrode 920 is made of a screen-shape metal mesh that has relatively large pores (i.e., greater than 10 microns). In the embodiment shown in FIG. 9A, the ground electrode 930 is also made of a cylindrical screen mesh that has a smaller-diameter and is positioned inside of the larger-diameter cylindrical metal mesh structure of the HV electrode 920. The ground electrode 930 has a center axis 945 that is coaxial and cylindrically symmetric with the HV electrode 920. The HV cylindrical metal mesh electrode 920 is connected to an HV power supply 950, whereas the cylindrical metal mesh ground electrode 630 is connected to a ground source external to the liquid vessel 905. The gap 940 between the HV electrode 920 and the ground electrode 930 is perpendicular to the center axis 945. The gap distance 940 between the HV electrode 920 and the ground electrode 930 is approximately 1 cm or less, the distance needed to generate spark plasma in liquid.

Figure 10:
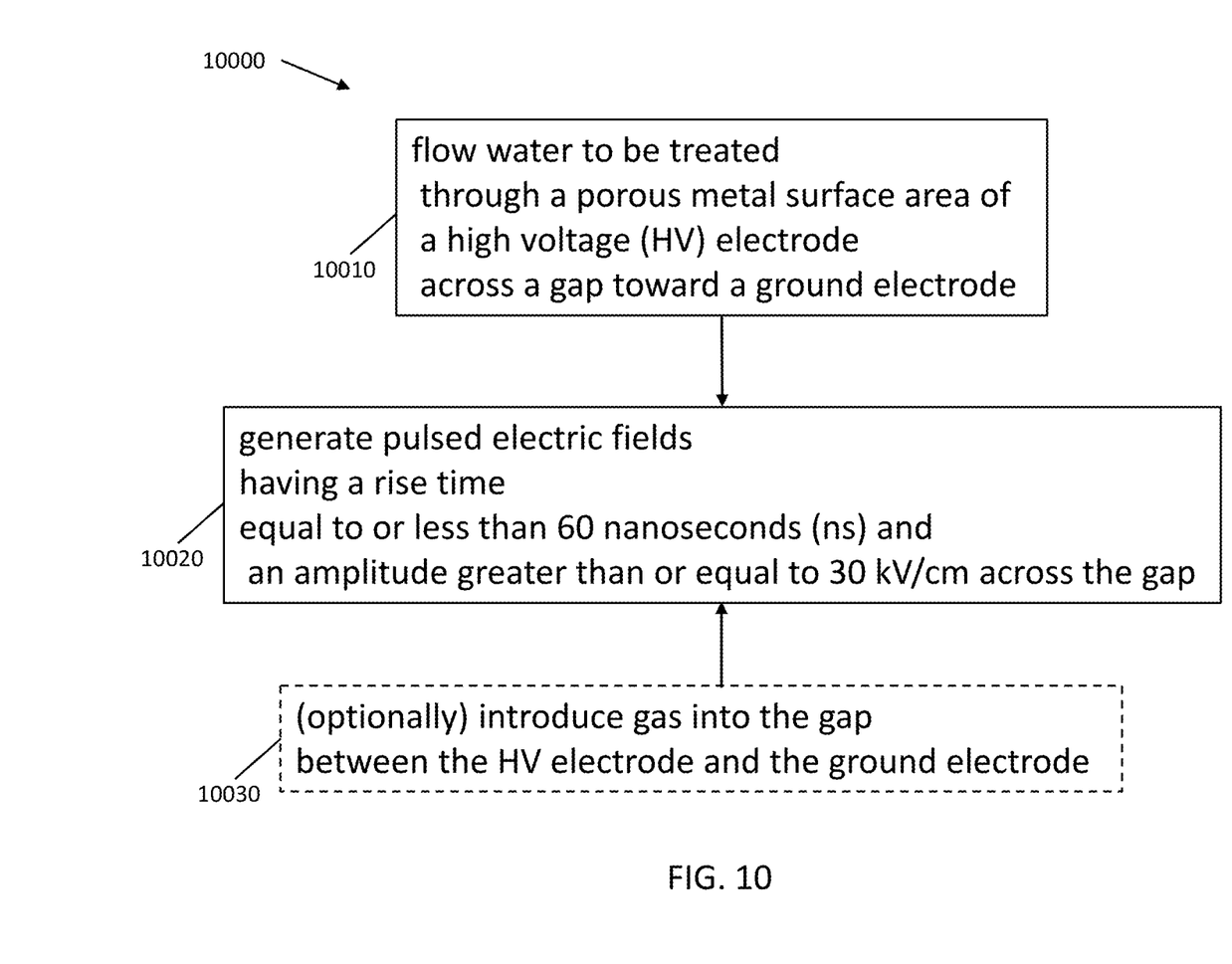
FIG. 10 a flow chart of a method of treating water in accordance with one or more embodiments.

In accordance with one or more embodiments, as shown in FIG. 10, a method 10000 of water treatment includes flowing 10010 water to be treated through a porous metal surface area of a high voltage (HV) electrode across a gap toward a ground electrode in fluid communication with the water, and generating 10020 pulsed electric fields having a rise time equal to or less than 60 nanoseconds (ns) and an amplitude greater than or equal to 30 kV/cm across the gap, thereby producing treated water. The method 10000 can optionally further include introducing 10030 gas into the gap between the HV electrode and the ground electrode while generating the pulsed electric fields.

The water treatment systems described above are unique for their extraordinarily simple and elegant design as well as for having a potentially low economic cost profile. In addition, the high reliability of established filter systems makes them an ideal platform for enhancement with an electronic disinfection technology. A key advantage of the water treatment systems described above is the use of the HV electrode and ground electrode at the filter outlet such that 100% of filtered water can be treated by pulsed PEF/spark plasma without interfering with the filtration and back-wash processes. When the two electrodes are connected to an HV power supply, they discharge controlled sparks and pulsed electric fields in the gap between the two electrodes. Operating expense is primarily the electricity input for driving the power supply. With very short duration pulses of 50 to 100 nanoseconds, a very high level of peak power can be delivered for sparking and disinfection, with only 10 to 2000 W of average electrical power consumption depending on the required PEF/spark frequency (1 to 100 Hz). Although the water treatment systems described above illustrate the application of the technology in a screen filter, the water treatment systems described above can also be applied to a media or disk filter, where both the HV and ground electrodes can be relatively simply installed without interfering the regular operation of these filters. Furthermore, in case of screen filter, the water treatment systems described above can be applied to a filter using a non-metal screen.

The water treatment systems described above provide physics-based disinfection without the use of chemicals such as chlorine and hydrogen peroxides. Preliminary estimates for the cost of electricity to power the water treatment systems described above are significantly lower than for hydrogen peroxide treatment formulation costs. Estimates range from 80% of hydrogen peroxide costs to as low as 1% depending on the disinfection rate of each PEF/spark pulse. Energy requirements are also expected to be significantly lower than UV disinfection and heat pasteurization. This simple enhancement to the design of existing filtration system electrically connects the two electrodes to an electronic power supply. When the power supply provides a controlled voltage potential with a very fast rise time, then sparks and pulsed electric fields discharged across the gap between the two electrodes disinfect irrigation water, while particles are being removed by the filter barrier (i.e., media, screed, or disk) at the same time.

Reliable, low-cost disinfection of irrigation water prevents pathogens from reaching plants and forming biofilm on the internal surface of emitters. With improved water treatment and no need to store or handle chemicals for disinfection, the water treatment systems described above may be able to help improve operations at farms and provide cost savings to growers.

FURTHER EXAMPLE EMBODIMENTS

Example 1 is a water treatment system that includes a water inlet that intakes water to be treated, a high voltage (HV) electrode having a porous metal surface area in a range of between 0.1 cm$^2$ and 5 cm$^2$ in fluid communication with the water, such that the water flows through the porous metal surface area of the HV electrode, a ground electrode disposed across a gap from the HV electrode, in fluid communication with the water, a high voltage power supply electrically connected to the HV electrode for generating pulsed electric fields having a rise time equal to or less than 60 nanoseconds (ns) and an amplitude greater than or equal to 30 kV/cm across the gap, thereby producing treated water, and a water outlet that discharges the treated water.

Example 2 includes the subject matter of Example 1, wherein the water to be treated has an electrical conductivity in a range of between 0.1 mS/cm and 5 mS/cm.

Example 3 includes the subject matter of any of Examples 1 or 2, wherein the gap is less than or equal to 1 cm.

Example 4 includes the subject matter of any of Examples 1-3, wherein the HV electrode and the ground electrode are opposing parallel plates.

Example 5 includes the subject matter of Example 4, wherein the HV electrode and the ground electrode are circular plates.

Example 6 includes the subject matter of Example 4, wherein the HV electrode and the ground electrode are square plates.

Example 7 includes the subject matter of Example 4, wherein the HV electrode and the ground electrode are rectangular plates.

Example 8 includes the subject matter of any of Examples 1-7, wherein the ground electrode has a porous metal surface area, such that the water flows through the porous metal surface area of the ground electrode.

Example 9 includes the subject matter of any of Examples 1-8, further including a plurality of pairs of HV electrode and ground electrode opposing parallel plates arranged in serial fluid communication with the water to be treated.

Example 10 includes the subject matter of any of Examples 1-8, further including a plurality of pairs of HV electrode and ground electrode opposing parallel plates arranged in parallel fluid communication with the water to be treated.

Example 11 includes the subject matter of any of Examples 1 or 2, wherein the ground electrode has a center axis that is coaxial and cylindrically symmetric with the HV electrode, with the gap between the HV electrode and the ground electrode perpendicular to the center axis.

Example 12 includes the subject matter of Example 11, wherein the HV electrode is a cylindrical metal mesh.

Example 13 includes the subject matter of any of Examples 11 or 12, wherein the ground electrode has a diameter that is smaller than a diameter of the HV electrode.

Example 14 includes the subject matter of any of Examples 11-13, wherein the ground electrode is a cylindrical metal mesh.

Example 15 includes the subject matter of any of Examples 11, 12, or 14, the ground electrode has a diameter that is larger than a diameter of the HV electrode.

Example 16 includes the subject matter of any of Examples 11-14, wherein the ground electrode includes metal rods.

Example 17 includes the subject matter of any of Examples 11-16, further including a bubble generator for introducing gas into the gap between the HV electrode and the ground electrode while generating the pulsed electric fields.

Example 18 includes the subject matter of any of Examples 11-17, further including a porous ceramic block in the gap between the HV electrode and the ground electrode.

Example 19 includes the subject matter of any of Examples 1-18, wherein the high voltage power supply is configured to generate pulsed electric fields at a frequency in a range of between 10 Hz and 70 Hz.

Example 20 includes the subject matter of any of Examples 1-19, wherein the high voltage power supply is configured to generate pulsed electric fields having an amplitude in a range of between 50 kV/cm and 100 kV/cm.

Example 21 is a method of water treatment that includes flowing water to be treated through a porous metal surface area of a high voltage (HV) electrode across a gap toward a ground electrode in fluid communication with the water, and generating pulsed electric fields having a rise time equal to or less than 60 nanoseconds (ns) and an amplitude greater than or equal to 30 kV/cm across the gap, thereby producing treated water.

Example 22 includes the subject matter of Example 21, further including introducing gas into the gap between the HV electrode and the ground electrode while generating the pulsed electric fields.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention.

What is claimed is:

1. A water treatment system comprising:
  a water inlet that intakes water to be treated;
  a high voltage (HV) electrode having a porous metal surface area in a range of between 0.1 cm$^2$ and 5 cm$^2$ in fluid communication with the water, such that the water flows through the porous metal surface area of the HV electrode;
  a ground electrode disposed across a gap from the HV electrode, in fluid communication with the water;
  a high voltage power supply electrically connected to the HV electrode for generating pulsed electric fields having a rise time equal to or less than 60 nanoseconds (ns)

and an amplitude greater than or equal to 30 kV/cm across the gap, thereby producing treated water; and a water outlet that discharges the treated water.

2. The water treatment system of claim 1, wherein the water to be treated has an electrical conductivity in a range of between 0.1 mS/cm and 5 mS/cm.

3. The water treatment system of claim 1, wherein the gap is less than or equal to 1 cm.

4. The water treatment system of claim 1, wherein the HV electrode and the ground electrode are opposing parallel plates.

5. The water treatment system of claim 4, wherein the ground electrode has a porous metal surface area, such that the water flows through the porous metal surface area of the ground electrode.

6. The water treatment system of claim 4, wherein the HV electrode and the ground electrode are circular plates.

7. The water treatment system of claim 4, wherein the HV electrode and the ground electrode are square plates.

8. The water treatment system of claim 4, wherein the HV electrode and the ground electrode are rectangular plates.

9. The water treatment system of claim 4, further including a plurality of pairs of HV electrode and ground electrode opposing parallel plates arranged in serial fluid communication with the water to be treated.

10. The water treatment system of claim 4, further including a plurality of pairs of HV electrode and ground electrode opposing parallel plates arranged in parallel fluid communication with the water to be treated.

11. The water treatment system of claim 1, wherein the ground electrode has a center axis that is coaxial and cylindrically symmetric with the HV electrode, with the gap between the HV electrode and the ground electrode perpendicular to the center axis, and wherein the HV electrode is a cylindrical metal mesh.

12. The water treatment system of claim 11, wherein the ground electrode has a diameter that is smaller than a diameter of the HV electrode.

13. The water treatment system of claim 11, wherein the ground electrode is a cylindrical metal mesh.

14. The water treatment system of claim 11, wherein the ground electrode has a diameter that is larger than a diameter of the HV electrode.

15. The water treatment system of claim 11, wherein the ground electrode comprises metal rods.

16. The water treatment system of claim 1, further including a bubble generator for introducing microbubbles of gas into the gap between the HV electrode and the ground electrode while generating the pulsed electric fields.

17. The water treatment system of claim 1, wherein the high voltage power supply is configured to generate pulsed electric fields at a frequency in a range of between 10 Hz and 70 Hz.

18. The water treatment system of claim 1, wherein the high voltage power supply is configured to generate pulsed electric fields having an amplitude in a range of between 50 kV/cm and 100 kV/cm.

19. The water treatment system of claim 1, wherein the high voltage power supply is configured to generate pulsed electric fields having a rise time in a range of between 20 ns and 50 ns.

20. The water treatment system of claim 1, wherein the gap is approximately 1 cm.

* * * * *